United States Patent Office 2,744,989
Patented May 8, 1956

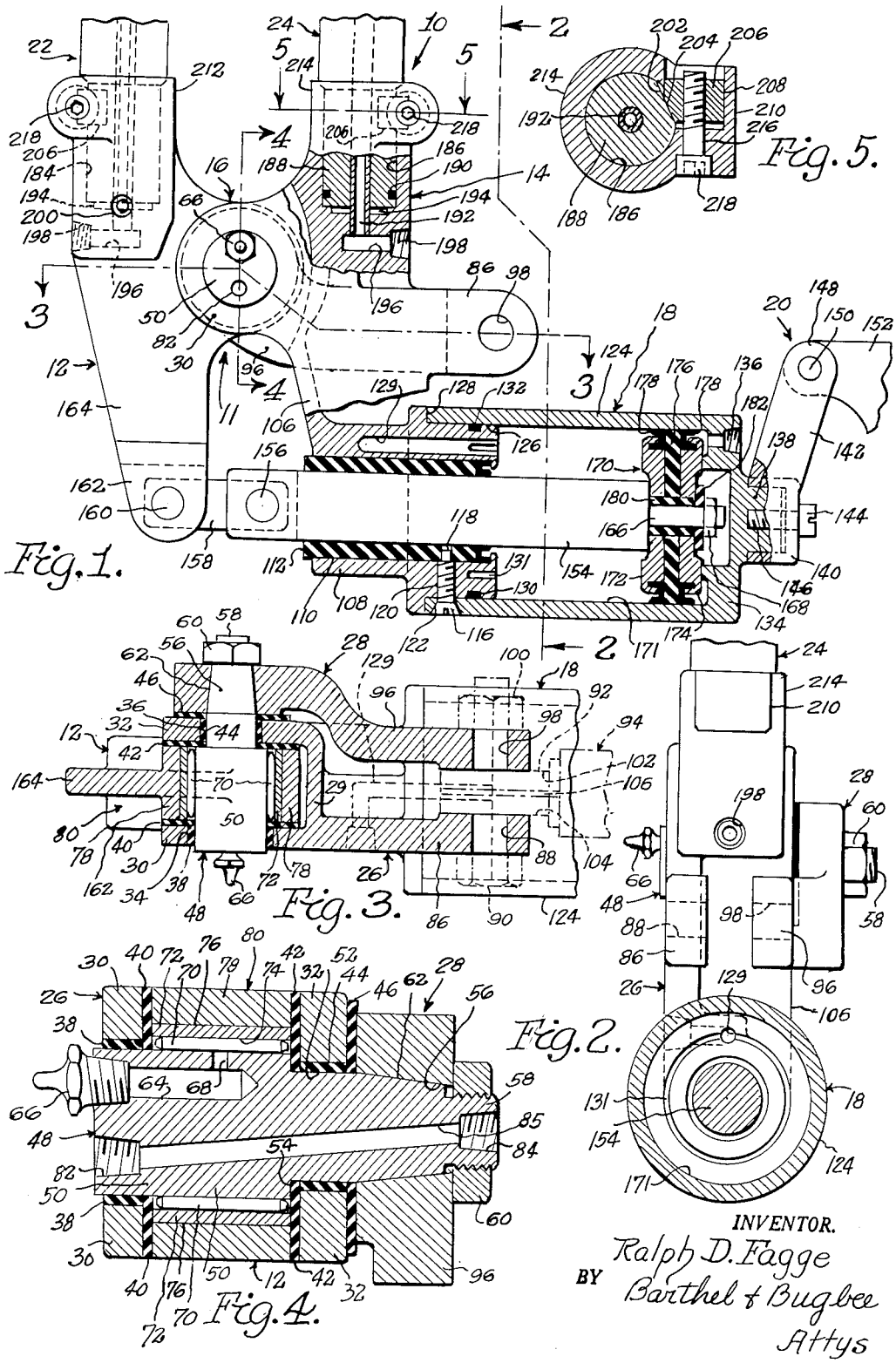

2,744,989
SCISSORS-TYPE SPOT WELDING GUN

Ralph D. Fagge, Detroit, Mich.

Application January 3, 1955, Serial No. 479,592

10 Claims. (Cl. 219—4)

This invention relates to welding guns for spot welding sheet metal and, in particular, to so-called scissors-type welding guns.

One object of this invention is to provide a scissors-type welding gun having its pivoted arms swung relatively to one another by a piston and cylinder operated by pressure fluid, such as compressed air, around an improved fulcrum structure which not only reduces friction to a minimum, prevents seizure of the parts at the fulcrum and reduces inertia of the moving parts, but also facilitates carrying the welding current through the fulcrum parts to one of the welding electrodes.

Another object is to provide a scissors-type welding gun of the foregoing character wherein the fulcrum is provided with anti-friction bearings employing needle rollers which also carry the welding current, thereby still further reducing friction and inertia to a minimum as compared with scissors-type welding guns which have previously employed plain sleeve bearings at the fulcrum.

Another object is to provide a scissors-type welding gun of the foregoing character wherein the fulcrum bearing is lubricated by a silver-impregnated current-carrying lubricant grease which increases the current-carrying capacity of the fulcrum while maintaining improved lubrication.

Other objects and advantages of the invention will become apparent during the course of the following description of the accompanying drawings, wherein:

Figure 1 is a top plan view of an improved scissors-type welding gun, according to one form of the invention, with certain portions thereof shown in horizontal section;

Figure 2 is a vertical cross-section, partly in side elevation, taken along the line 2—2 in Figure 1;

Figure 3 is a vertical section approximately at right angles to the section of Figure 2, taken along the line 3—3 in Figure 1, showing a portion of the fulcrum construction;

Figure 4 is an enlarged longitudinal section through the fulcrum taken along the line 4—4 in Figure 1; and Figure 5 is a cross-section taken along the line 5—5 in Figure 1, showing the means for mounting the electrode-carrying arms in their respective sockets to prevent relative rotation thereof.

Referring to the drawings in detail, Figure 1 shows the rearward portion of an improved scissors-type welding gun, generally designated 10, according to one form of the invention, the forward portion of the gun 10 containing the electrodes being of conventional construction and therefore omitted from the drawing. The welding gun 10, as shown in Figure 1, is used for spot welding sheet metal parts to one another on production lines or in factories or other locations where it is more convenient to bring the welding gun to the work, rather than the work to a non-portable welding machine. The term "welding gun" is commonly applied to a portable welding instrument of the kind shown in the drawings.

The welding gun 10 includes a pivoted arm-supporting structure, generally designated 11, having a pair of relatively pivoted arm supports, generally designated 12 and 14 respectively, swinging relatively to one another about a fulcrum structure, generally designated 16, the latter being shown in more detail in Figure 4. The arm supports 12 and 14 are swung relatively to one another by a pressure-fluid-operated reciprocating motor, generally designated 18, this in turn carrying a handle unit, generally designated 20. Each of the arm supports 12 and 14 is equipped to receive and hold a welding arm unit 22 or 24, these arm units being of conventional construction and therefore shown only at their rearward ends. The arm units 22 and 24 at their forward ends carry conventional wielding electrodes (not shown) which are brought into engagement with the exposed side of the sheet metal parts to be welded, squeezing the latter together as the welding current is applied, the clamping being accomplished by the action of the reciprocating motor 18 as described below in connection with the operation of the invention.

The arm support 14 (Figures 1 and 3) includes two members 26 and 28 insulated from one another in the manner described below and having opposite electrical polarities, as explained below. The member 26 has a hub portion 29 with spaced parallel ears 30 and 32 centrally bored as at 34 and 36 respectively to different diameters, and containing insulating sleeves and discs 38 to 46 inclusive (Figure 3). Mounted in the bores 34 and 36 is a fulcrum member, generally designated 48 (Figure 4) including a large diameter cylindrical portion 50 at one end, a smaller diameter cylindrical portion 52 intermediate its opposite ends and connected to the larger portion 50 by an annular shoulder 54, a tapered or conical portion 56 leading from the smaller cylindrical portion 52, and a smaller diameter threaded end portion 58 at the outer or smaller end of the tapered or conical portion 56. The outer threaded portion carries a nut 60 threaded thereon so as to hold the member 28 in assembly with the member 26 upon the fulcrum member 48. For this purpose, the member 28 is provided with an internal conical or tapered bore 62 which corresponds in taper to the tapered portion 56.

The fulcrum member 48 is further provided with a longitudinal lubricant passageway 64 (Figure 4) having a conventional lubricant fitting 66 at its outer end for receiving a lubricant injection gun, and at its inner end is provided with one or more radial passageways 68 by which the lubricant reaches an annular row of needle bearings 70 which engage and roll around the cylindrical portion 50 which serves as the inner race for these needle bearings or needle rollers 70. The needle rollers 70 are preferably of beryllium copper alloy for hardness and wear resistance accompanied by high electrical conductivity. Surrounding the needle rollers 70 is a sleeve or bushing 72 (Figure 4) forming the outer race of the needle rollers 70 which roll around its bore 74 during operation. The bushing 72 in turn is mounted within the cylindrical bore 76 of the hub 78 of the arm support 12, the bushing 72 and needle rollers 70 in assembly with the cylindrical portion 50 of the fulcrum member 48 forming a needle bearing assembly or unit, generally designated 80. The fulcrum member 48 is provided at its opposite ends with threaded ports 82 and 84 respectively interconnected by a passageway 85. The ports 82 and 84 are threaded to receive standard pipe connections (not shown) to which pipes carrying incoming and outgoing cooling water are respectively connected. In this manner, the fulcrum structure 16 is cooled and the heat resulting from the passage of welding current through it is quickly and efficiently removed.

Extending in the opposite direction to the ears 30 and 32 from the hub 29 of the member 26 is a welding cable connection lug or terminal 86 (Figure 3) which is bored as at 88 to receive the bolt 90 by which the cable head 92 of a welding cable 94 is clamped thereto. The member 28 is similarly provided with an offset cable connection lug or terminal 96 having its outer end portion parallel to the lug or terminal 86 and provided with an aligned bore 98 adapted to also receive the clamping bolt 90, which at its threaded end carries a clamping nut 100. The welding cable 94 is conventional and its details form no part of the present invention. It may consist, for example, of a welding cable of the type shown in the Wreford Patent No. 2,504,777 of April 18, 1950, wherein flexible braided copper cables (not shown) carry current of high amperage and low voltage from a welding current transformer to semicylindrical electrodes 102 and 104 insulated from one another by an insulating strip 106. Thus, the welding cable electrode 104 electrically engages the member 26 and the welding cable electrode 102 electrically engages the member 28, the clamping bolt 90 being insulated from one or both of these members 26 and 28 and from the electrodes 102 and 104 by a tubular insulating sleeve and insulating washers (not shown).

The arm support 14 is also provided with a motor bracket 106 (Figure 1) of approximately L-shaped cross-section extending rearwardly from the arm support 14 and having a tubular boss 108 thereon provided with a bore 110 for receiving a tubular insulating bushing or sleeve 112. The insulating bushing 112 is held in position by a set screw 116 engaging a hole 118 in the insulating bushing 112. The set screw 116 is threaded through a radial hole 120 in the boss 108 and also through a hole 122 in a cup-shaped reciprocating motor cylinder 124 forming the outer portion of the reciprocating motor 18. The cylinder 124 engages a cylindrical surface 126 on the boss 108 and its end engages an annular shoulder 128 thereon, the cylindrical surface 126 being grooved as at 130 to receive a conventional "O-ring" or other sealing gasket 132. The boss 108 is provided with a fluid discharge passageway 129 extending therethrough from an annular groove 121 therein.

The opposite end of the cylinder 124 is provided with a head or end wall 134 having a threaded port 136 therein for the attachment of a compressed air hose or other source of pressure fluid for operating the motor 18. Extending rearwardly from the cylinder head 134 is a cylindrical boss 138 which receives the cup-shaped end 140 of a handle arm 142 which is held in assembly therewith by a set screw 144 threaded into the threaded hole 146 in the boss 138. The opposite end of the handle arm 142 is provided with spaced ears 148 which are bored to receive the pivot pin or pivot bolt 150 by which the handle 152 is pivotally secured to the handle arm 142. The handle 152 is preferably of the pistol grip type (not shown) with valve means for controlling the supply of compressed air to the port 136.

Reciprocably mounted in the insulating bushing 112 is a piston rod 154 (Figure 1) bored at its outer end to receive a pivot pin 156 pivotally connecting it to one end of a similarly-bored link 158, the opposite end of which is bored to receive a second pivot pin 160 seated in the correspondingly-bored ears 162 in the outer or rearward end of the lug 164 extending rearwardly from the arm support 12. The piston rod 154 at its opposite or inner end is provided with a reduced diameter portion 166 (Figure 1) which is threaded at its end to receive a nut 168 by which a piston head unit, generally designated 170, is held thereon. The piston head unit 170 is reciprocably mounted in the cylinder bore 171 and includes two head halves 172 and 174 which are spaced apart from one another by an insulating disc 176 and are internally-grooved to receive oppositely-directed annular packings 178. An insulating bushing 180 surrounds the reduced diameter piston rod portion 166 and passes through the piston head halves 172 and 174 and the insulating disc 172, all three of which are bored suitably to receive the bushing 180. An insulating washer 182 separates the nut 168 from the piston head valves 174.

The arm supports 12 and 14 are provided with cylindrical sockets 184 and 186 to receive the cylindrical reduced diameter inner ends 188 of the arms 22 and 24, these being grooved to receive O-rings 190. The arms 22 and 24 are centrally bored to receive a cooling water tube 192 which extends through an annular clearance space 194 into the arm 22 or 24 from a transverse passageway 196 terminating in a threaded port 198. The annular space 194, which is connected by a passageway (not shown) extending through the arms 22 and 24 to the end thereof, is provided with a threaded port 200. The ports 198 and 200 are connected to cooling water supply and discharge pipes or hose (not shown) by which cooling water is conducted through the arms 22 and 24 to the welding electrodes at the outer ends thereof to remove the heat generated during welding. These cooling arrangements are beyond the scope of the present invention and consequently are mentioned only briefly.

In order to prevent rotation of the arms 22 and 24 in their sockets 186, the cylindrical inner portions 188 thereof are flattened as at 202 along one side thereof for engagement by the correspondingly flattened side 204 of a clamping nut 206 which is seated in a socket 208 in a boss 210 at one side of the cylindrical extension 212 or 214 of the arm support 12 or 14, containing the sockets 184 and 186 respectively. The boss 210 is bored and threaded as at 216 to receive a headless set screw 218 which is threaded through the clamping nut 206 and rotated by a so-called Allen wrench of the usual well-known construction.

In the operation of the invention, let it be assumed that the outer ends of the arms 22 and 24 have been provided with welding electrodes, that cooling water supply and discharge hoses have been connected to the ports 82 and 84 and also to the ports 198 and 200, and that a compressed air supply hose has been connected to the threaded port 136. Let it further be assumed that the welding cable 94 has been suitably clamped to the welding gun 10 by the insulated clamping bolt 90 (Figure 3) and that its opposite end has been connected to a welding transformer or other source of welding current. The operator now manipulates the welding gun 10 so as to place the welding electrodes on opposite sides of the two sheet metal pieces to be spot welded and to position them at the location desired for the weld, whereupon the operator actuates the compressed air valve (not shown) to admit compressed air to the right-hand end of the cylinder bore 171 through the threaded port 136. This action causes the cylinder head unit 170 to be propelled to the left, and with it the piston rod 154. The latter, through its connection by the link 158 with the lug 164, pushes the lug 164 to the left so as to swing the arm support 12 clockwise around the fulcrum structure 16, bringing the electrode on the outer end of the arm 22 into engagement with the sheet metal workpieces and forcing them into clamped engagement with the corresponding electrode on the outer end of the welding electrode arm 24.

The closing of the circuit in this manner causes welding current to flow, for example, from the electrode 102 of the welding cable 94 through the member 28 and the fulcrum member 48 to and through the needle rollers 70 and outer race 72 of the needle bearing unit 80 to the arm support 12, thence through the arm 22 to the welding electrode on the outer end thereof. From the latter, the welding current flows through the work to the opposite welding electrode, thence through the arm 24, arm support 14, member 26, lug 86 and electrode 104 of the cable 94, completing the welding circuit therethrough. The flow of welding current in this manner causes the sheet metal workpieces to be spot-welded at their point of contact and the heat developed during the weld is carried away by the cooling water.

Meanwhile, the cooling water around the fulcrum unit 16 carries away the heat developed by the passage of the welding current therethrough, by cooling water passing through the passageway 85 (Figure 4). Lubrication of the fulcrum unit 16 is provided by a lubricant impregnated with silver, so that the lubricant itself conducts electricity. The needle bearing rollers 70, being spaced close to one another around the periphery of the cylindrical portion 50 of the fulcrum member 48, conduct the welding current efficiently across the annular gap in which they are mounted, as well as reducing friction to a minimum at the fulcrum of the fulcrum unit 16. The result is that the arm supports 12 and 14 and their arms 22 and 24 swing freely relatively to one another under the action of the fluid pressure motor 18, providing rapid and efficient welding action.

What I claim is:

1. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports.

2. A scissors-type spot welding gun comprising a pair of arm supports having fulcrum portions projecting toward one another intermediate their opposite ends, a welding electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said pivot element, an electrical insulating structure disposed between said fulcrum structure and the terminal-attached arm support, and insulating means disposed between said motor and one of said arm supports.

3. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said pivot element, an electrical insulating structure disposed between said pivot element and the terminal-attached arm support, and insulating means disposed between said motor and one of said arm supports.

4. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports, said terminals having aligned cable-connection portions thereon.

5. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arms supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports, said terminals having aligned cable-connection portions with coaxial clamping fastener bores therein.

6. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports, said pivot element having a projecting end portion, and said second terminal including a member secured to said projecting end portion and extending into spaced proximity to said first terminal.

7. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports, said pivot element having a lubricant-conducting passageway therein communicating with said inner raceway, and having a lubricator coupling secured thereto in communication with said passageway.

8. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports, said pivot element having a lubricant-conducting passageway therein communicating with said inner raceway and having a lubricator coupling secured thereto in communication with said passageway, said fulcrum structure containing an electrical-conductor-impregnated lubricant disposed in said passageway and extending into the space between said raceways.

9. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of one of said arm supports and reciprocably engaging the corresponding opposite end of the other of said arm supports, a fulcrum structure pivotally disposed between said fulcrum portions, said fulcrum structure including a pivot element with outer and inner cylindrical raceways coaxial therewith and multiple needle bearing rollers disposed in an annular path between said raceways in rolling engagement therewith, a first welding cable connection terminal attached to one of said arm supports, a second welding cable connection terminal attached to said fulcrum structure, an electrical insulating structure disposed between said fulcrum structure and the terminal-attached arm support, and insulating means disposed between said motor and one of said arm supports.

10. A scissors-type spot welding gun comprising a pair of arm supports having fulcrum portions projecting toward one another intermediate their opposite ends, a welding-electrode-carrying arm secured to one end of each arm support, a reciprocatory electrode-clamping motor mounted on the opposite end of said arm supports and reciprocably engaging the corresponding opposite end of the other of said arm supports, said motor having a cylinder, a piston head reciprocably mounted in said cylinder, a piston rod connected to said piston head and extending outward from said cylinder, electrical insulation disposed between said piston head and said cylinder, and electrical insulation disposed between said piston rod and said cylinder; a fulcrum structure pivotally disposed between said fulcrum portions, said fulcrum structure including a pivot element with outer and inner cylindrical raceways coaxial therewith and multiple bearing rollers disposed in an annular path between said raceways in rolling engagement therewith, a first welding cable connection terminal attached to one of said arm supports, a second welding cable connection terminal attached to said fulcrum structure, and an electrical insulating structure disposed between said fulcrum structure and the terminal-attached arm support.

No references cited.